United States Patent [19]

Tsai et al.

[11] Patent Number: 5,529,834
[45] Date of Patent: Jun. 25, 1996

[54] HEAT SEALABLE MULTILAYER FILM COMPRISING EVOH SKIN AND ACRYLIC COATING AND ITS METHOD OF PREPARATION

[75] Inventors: Mingliang L. Tsai, East Brunswick, N.J.; Anthony R. Knoerzer, Plano, Tex.

[73] Assignee: Mobil Oil Corporation, Fairfax, Va.

[21] Appl. No.: 348,396

[22] Filed: Dec. 2, 1994

[51] Int. Cl.$^6$ ...................................... B32B 7/02
[52] U.S. Cl. .................. 428/215; 428/349; 428/515; 428/910; 427/460; 156/244.11
[58] Field of Search .................... 428/910, 515, 428/349, 215; 427/460; 156/244.11

[56] References Cited

U.S. PATENT DOCUMENTS

| | | | |
|---|---|---|---|
| 3,480,580 | 11/1969 | Joyner et al. | 260/29.6 |
| 3,753,769 | 8/1973 | Steiner | 117/122 |
| 4,152,387 | 5/1979 | Cloeren | 264/171 |
| 4,561,920 | 12/1985 | Foster | 156/244 |
| 4,650,721 | 3/1987 | Ashcraft et al. | 428/516 |
| 4,880,706 | 11/1989 | Mazuera et al. | 428/516 |
| 4,919,984 | 4/1990 | Maruhashi et al. | 428/36.4 |
| 5,192,620 | 3/1993 | Chu et al. | 428/910 |
| 5,213,858 | 5/1993 | Tanner | 428/349 |
| 5,283,118 | 2/1994 | Murkami et al. | 428/349 |

*Primary Examiner*—Edith Buffalow
*Attorney, Agent, or Firm*—Ronald A. Bleeker; Malcolm D. Keen; Laurence P. Hobbes

[57] ABSTRACT

A multilayer heat sealable film comprises:

(a) a polyolefin film substrate layer;

(b) a layer of an ethylene vinyl alcohol copolymer (EVOH), and (c) a heat sealable acrylic polymeric coating applied to (b). The film exhibits excellent oxygen and aroma barrier, and low minimum seal temperature (82° C.).

19 Claims, No Drawings

HEAT SEALABLE MULTILAYER FILM COMPRISING EVOH SKIN AND ACRYLIC COATING AND ITS METHOD OF PREPARATION

BACKGROUND OF THE INVENTION

This invention relates to a multi-layer film structure comprising a polyolefin core layer, an ethylene-vinyl alcohol copolymer (EVOH) skin, and an acrylic coating.

Acrylic copolymers have been used as heat sealable coatings for oriented thermoplastic films such as polypropylene film. When thermoplastic film substrates are coated with these heat sealable coatings, it is particularly important to insure that the adhesion of the coating layer to the film substrate is adequate. In many packaging operations it is necessary for the coated film to be heat sealed to itself or to other films to form tightly closed packaging. If the coating adhesion to the base film is inadequate, the packages may prematurely open when subjected to stress.

In general, acrylic coatings do not adhere well to certain polyolefin film surfaces, e.g., polypropylene, even when the latter have been subjected to well known pretreatment operations such as treatment by corona discharge, flame, or oxidizing chemicals. Accordingly, it has often been found necessary to apply a thin intermediate primer layer to the surface of the polyolefin base film before applying heat sealable topcoats. Moreover, the acrylic coatings themselves are not especially effective as oxygen and aroma barriers.

Ethylene vinyl alcohol copolymer (EVOH) films are excellent barriers to oxygen, carbon dioxide and nitrogen. They are also effective barriers against odors and the loss of flavor. EVOH resins, however, are moisture sensitive and their barrier properties are reduced in the presence of high humidity.

Biaxially oriented coextruded multilayer films in which an EVOH layer is sandwiched between two polyolefin layers, e.g., polypropylene or high density polyethylene (HDPE) layers, are described in U.S. Pat. No. 4,561,920 which is incorporated herein by reference.

U.S. Pat. No. 4,880,706 to Mazuera et al. discloses multilayer films which are extruded to provide a core layer of ethylene-vinyl alcohol copolymer (EVOH) which is encapsulated on its top and bottom surfaces by a polyolefin layer, e.g. polypropylene. The extrudate is cooled and subjected to machine direction orientation to a degree greater than four times, and to transverse direction (TD) orientation to a degree greater than seven times.

It would be advantageous to provide an acrylic coated polyolefin film which enjoys not only enhanced sealing characteristics but enhanced oxygen and aroma barrier as well. Moreover, it is desirable to provide a method for reducing the minimum seal temperature of a heat sealable film in order to permit heat sealing at lower temperatures which is advantageous in that it provides a wider seal range and lower heat settings on the sealing bar which is especially advantageous when running products that melt, such as chocolate.

SUMMARY OF THE INVENTION

The present invention relates to a multilayer heat sealable film comprising:

(a) a polyolefin film substrate layer;

(b) a layer of an ethylene vinyl alcohol copolymer (EVOH), and (c) a heat sealable acrylic polymeric coating applied to (b).

The resulting film exhibits excellent water and gas barrier, great resistance towards flavor and aroma permeation, as well as enhanced sealability as evidenced by unexpectedly reduced minimum seal temperature compared to such or similar films lacking the EVOH component. Such minimum seal temperatures can be less than 93° C, preferably no greater than 82° C.

In another aspect, the present invention relates to a method for preparing an acrylic coated multilayer film which comprises a) coextruding i) a polyolefin film core layer and ii) an EVOH skin layer on at least one side of said core layer to form a coextrudate;

b) biaxially orienting said coextrudate; and c) coating said biaxially oriented coextrudate with acrylic coating.

In yet another aspect, the present invention relates to a method for reducing the minimum seal temperature of an acrylic coated multilayer film having a polyolefin film core layer which comprises incorporating an EVOH skin layer on at least one side of said core layer prior to coating said multilayer film with acrylic coating.

DETAILED DESCRIPTION OF PREFERRED EMBODIMENTS

The polyolefin film substrate layer used in the present invention can be of a polyolefin selected from the group consisting of polyethylene, including low density polyethylene, high density polyethylene, and linear low density polyethylene, polypropylene, and copolymers of ethylene with higher olefins. The preferred polymers for use as the polyolefin layer are homopolymer polypropylene and ethylene propylene copolymers containing predominately propylene. In oriented films of the present invention, the melt flow rate of the polyolefin layer must not be so low that it is too stiff and thus unorientable. For propylene ethylene copolymers, it is preferred that the melt flow rate be from 2.5 to 6.0 grams per 10 minutes at 230° C. and a load of 2,160 grams. For polypropylene, it is preferred that the melt flow rate be from 2.5 to 4.5. In this range, the viscosities of the copolymer and the polypropylene are most compatible with EVOH. Also, in this range, orientation of the copolymer or the polypropylene results in the best properties.

The ethylene vinyl alcohol (EVOH) copolymers used in the present invention are the saponified or hydrolyzed product of an ethylene-vinyl acetate copolymer having, generally, an ethylene content of 20 to 80 mole % and a saponification number of at least 50%. If the film is to be oriented, it is preferred that the percent ethylene in the EVOH be at least 40 percent, say, at least 45 percent, so that the EVOH is flexible enough to be stretched during the orientation process. Optimal barrier properties are obtained at hydrolysis levels of at least 96 percent, preferably at least 99 percent. However, high levels of hydrolysis can cause difficulties during extrusion of the EVOH. Accordingly, where extrudability of EVOH is concerned, optimal levels of hydrolysis can range from 10 to 90 percent, depending on the balance of properties required. The melt flow rate of the EVOH ranges from 3 to 9 grams per 10 minutes at 190° C. and a load of 2,160 grams. The EVOH skins can be applied to one or, optionally, both sides of the polyolefin film substrate layer.

The heat sealable acrylic polymeric coating can, for example, be derived from any of the terpolymeric compositions disclosed in U.S. Pat. No. 3,753,769, the contents of which are incorporated herein by reference. These coating compositions contain as a film forming component a resin consisting essentially of an interpolymer of (a) from 2 to 15, and preferably from 2.5 to 6, parts by weight of an alpha-beta monoethylenically unsaturated carboxylic acid selected from the group consisting of acrylic acid, methacrylic acid, and mixtures thereof, and (b) from 85 to 98, and preferably from 94 to 97.5, parts by weight of neutral monomer esters, said neutral monomer esters preferably comprising (1) methyl acrylate or ethyl acrylate and (2) methyl methacrylate. These interpolymer compositions are further characterized as preferably comprising from 30 to 55 percent by weight of methyl methacrylate when said alkyl acrylate is methyl acrylate, and from 52.5 percent to 69 percent by weight of methylmethacrylate when said alkyl acrylate is ethyl acrylate. Such coating compositions can be applied to the films herein in a variety of ways including in the form of ammoniacal solutions.

Similarly useful are copolymeric coating compositions prepared exclusively from the foregoing neutral monomer esters. These coating compositions are advantageously applied to the film laminates in the form of emulsions.

An adhesive tie layer can be used to enhance adhesion between the EVOH layer and the polyolefin film substrate layer when such layers are incompatible in their natural state. The adhesive layer when used can be any of a number of proprietary materials such as described in U.S. Pat. No. 4,561,920. Suitable adhesives include CXA-3036 (TM) (an ethylene-vinyl acetate copolymer available from DuPont), a high density polyethylene based adhesive, e.g., Bynel 4003 (TM) available from DuPont, the Admer (TM) adhesives from the Mitsui Petrochemical Company, e.g., QF500A (TM) and QF 550A (TM), and the Plexar (TM) family from USI Chemicals, e.g., a maleic anhydride grafted LDPE, Quantum Plexar 201 (TM). Suitable maleic anhydride modified polyolefins include maleic anhydride modified polypropylene homopolymer or copolymer which are especially suitable for use as adhesive tie layer in the present invention. Such material result from the reaction between maleic anhydride and the thermal degradation product of polypropylene or polypropylene copolymer. Examples of this material are disclosed in U.S. Pat. No. 3,480,580, the contents of which are incorporated herein by reference in its entirety. Particular attention is directed to Examples 3, 4, and 6 of this patent. A commercially available maleic anhydride modified polypropylene is Epolene E-43(TM), from Eastman Kodak Company of Rochester, N.Y.

The adhesive tie layer can be dispensed with by including an adhesion promoter in the polyolefin layers as described in U.S. Pat. No. 4,650,721, which is incorporated herein by reference. That patent discloses the polyolefin layers (polypropylene) which contain a maleic anhydride modified olefin polymer. Alternatively, a tie layer can be made using a thin layer of maleic anhydride modified polypropylene, e.g., Epolene E-43(TM) in conjunction with the polypropylene.

Multilayer films of the present invention can be prepared employing commercially available systems for coextruding resins. In one embodiment, the polyolefin layer can be coextruded with the EVOH layer, and where desired, coextruded with a tie adhesive layer between them. The polymers can be brought to the molten state and coextruded from a conventional extruder through a flat sheet die, the melt streams being combined in an adapter prior to being extruded from the die. After leaving the die orifice, the multilayer film structure can be chilled and the quenched sheet then reheated and oriented.

Alternatively, one or more of the group consisting of the polyolefin core layer, the EVOH skin layer, and the adhesive tie layer can be separately extruded.

The multilayer coextruded film can be biaxially oriented. Biaxially oriented film can be stretched 3 to 7 times, preferably 4.5 to 6 times, in the machine direction (MD), and 4 to 15 times, preferably 6 to 12 times, in the transverse direction (TD). The overall orientation (MD×TD) can range from about 20 to 91. After orientation, the edges of the film can be trimmed and the film wound onto a core.

The EVOH layer is coated with the acrylic polymeric coating by conventional techniques as noted above. Such coating can be carried out either before or after, preferably after, the EVOH layer is combined with the polyolefin core layer, and after orienting of the substrate (or during orienting of the substrate, e.g., applying the coating between the MD and TD stretching steps). In one embodiment, adhesive is coextruded between polypropylene and EVOH, and the PP/adhesive/EVOH is coated with acrylic on top of the EVOH in a separate coating process.

Because of the very high surface energy of EVOH, priming of the EVOH is ordinarily not needed for many conventional applications prior to the acrylic coating of the EVOH layer. However, if necessary, a suitable primer can be used to prepare the EVOH prior to acrylic coating. Typical primers for such purpose include an aqueous polyethyleneimine solution. Polyethyleneimine primer is commercially available and is generally applied as a 0.1%–0.6% by weight polyethylene imine solution in water or organic solvent.

In one embodiment, the present invention relates to a method of making a biaxially oriented composite barrier film having two or more layers which can be conducted in a continuous manner.

First, a composite sheet comprising polyolefin, e.g., polypropylene homopolymer, EVOH barrier layer, and optional adhesive tie layer, is formed by coextrusion of the above components. One way of accomplishing this is to use two extruders (or three where the adhesive layer is coextruded) and have the materials fed into a combining feed block. Within the feed block, the materials are layered to form the multilayer melt stream wherein the adhesive can be interposed between the polyolefin core layer and the EVOH. The melt stream is fed into a slot cast sheet die or other type of die to form the multi-layer sheet. As the sheet exits the die, it is immediately cooled by use of a cooling drum or a water bath to a temperature of about 40° to 50° C. Immediately after cooling, the composite sheet can be fed into an apparatus for MD orientation of the plastic material. Any such apparatus can be used in the present invention. In one embodiment, the composite sheet is fed into a set of differential speed heated rollers to stretch the sheet in the longitudinal direction to a degree ranging from 4:1 to 7:1, preferably 4.5:1 to 6:1 say, e.g., 5:1. Next, the sheet can be fed to a tenter frame where it is stretched in the transverse direction to a degree of greater than 5:1, preferably from 5:1 to 13:1, e.g., 6:1 to 12:1. MD orientation is generally conducted by preheating the film at 130° C. to 145° C., stretching in the same temperature range, and annealing at about 115° C. to 125° C. Preheating for TD orientation is advantageously done at 160° C. to 175° C., stretching at 145° C. to 160° C., and annealing at 155° C. to 165° C.

Finally, the sheet, either before or after coating with acrylic, can optionally be subjected to treatment in the known manner, e.g., corona discharge treatment or flame treatment, to improve its surface characteristics, e.g., printability.

Preferably, the multilayer extrusion is conducted in a Cloeren feedblock which is commercially available and is described in U.S. Pat. No. 4,152,387, the entire contents of which are incorporated herein by reference. The Cloeren feedblock permits a great degree of control of the relative thickness of the several layers and permits the extrusion of polymers which have widely differing melt flow.

The coextrusion capability of EVOH allows for two extremely distinct polymers to be combined together and permits the use of EVOH skins of very thin thickness to be used, particularly where the polyolefin layer is a high density polyethylene (HDPE). EVOH layers can range from 0.001–0.30 mil thickness, preferably from 0.01–0.20 mil thickness, say 0.05 to 0.1, in a multi-layer film ranging from 0.5 to 2.0 mil, e.g., 0.7 to 1.3, say about 1.0 mil, in overall thickness.

The films of this invention are suitable in a variety of applications in which moisture and gas barrier properties are desired. The films are particularly useful in food packaging.

The invention is illustrated by the following non-limiting examples in which all parts are by weight unless otherwise specified.

EXAMPLE 1 (COMPARATIVE)

A monolayer film structure was made with a homopolymer polypropylene core made from Exxon 4252. The homopolymer was extruded to make a 1.0 mil monolayer film after orienting 4 to 4.5 times in the machine direction and 7.8 to 9 times in the transverse direction. The extrudate was quenched at 37° C. on a casting drum in a 37° C. water bath. The base sheet was differentially reheated to 120° C. and stretched in the machine direction (MD) 4.5 times by means of transport rolls at different speeds. After MD orientation, the films were transversely oriented in a heated oven with tenter frame 8 times, treated for printability by corona discharge and coated with acrylic material. The acrylic coating used was prepared according to Example 1 of U.S. Pat. No. 3,753,769, incorporated herein by reference, and applied over a PEI primer. Both coatings were applied by Reverse Direct Gravure coating and dried in floatation ovens. The resulting film exhibited a 200 gram/in seal at 102° C. Oxygen barrier was measured by MOCAN OXYTRAN 1000 at 73° F., and 0% relative humidity and aroma barrier was measured by toluene permeation. The $TO_2$ of the resulting 1.00 mil acrylic film was about 100 cc/100 in$^2$/24 hr at 24° C. The minimum seal temperature, i.e., the temperature required to achieve a 200 g/in seal using the crimp seal test was 93° C. (20 psi, ¾ second dwell).

EXAMPLE 2

A multilayer film structure was made with a homopolymer polypropylene core of Fina 3371 (melt flow=3, melting point=167° C., density=0.907, (or alternately, Exxon 4252) an EVOH layer (EVAL G156B (melt index=6.4, melting point=158° C., density=1.12, available from Kuraray), and a tie layer of maleic anhydride modified polypropylene (Mitsui QF500A (Melt Flow=3; melting point=158° C., density= 0.907) to enhance the adhesion between the EVOH and polypropylene layers. The materials were coextruded to make a 1.0 mil monolayer film having a 0.07 mil EVOH skin after orienting. The coextrudate was quenched at 37° C. on a casting drum in a 37° C. water bath. The base sheets were differentially reheated to 120° C. and stretched in the machine direction (MD) 5 times by means of transport rolls at different speeds. After MD orientation, the films were transversely oriented in a heated oven with tenter frame 8 times, treated for printability by corona discharge and coated with acrylic material. The acrylic coating used was prepared according to Example 1 of U.S. Pat. No. 3,753,769, incorporated herein by reference, and applied over a PEI primer. Both coatings were applied by Reverse Direct Gravure coating and dried in floatation ovens. The resulting film exhibited a 200 gram/in seal at 93° C. Oxygen barrier as measured by MOCON OXYTRAN 1000 at 73° F., 0% relative humidity, indicated that the $TO_2$ of the resulting 1.00 mil acrylic film was only 2.00 cc/100 in$^2$/24 hr at 24° C. Aroma barrier as measured by toluene permeation indicated that the EVOH skin dramatically improved aroma barrier over the comparative acrylic coated film. The minimum seal temperature, i.e., the temperature required to achieve a 200 g/in seal using the crimp seal test was reduced by 11° C. to 82° C. (20 psi, ¾ second dwell).

Thus, while there have been described what are presently believed to be the preferred embodiments of the present invention, those skilled in the art will realize that other and further changes and modifications can be made without departing from the spirit of the invention, and it is intended to include all such changes and modifications as come with the true scope of the invention.

What is claimed is:

1. A multilayer heat sealable film comprising:
   (a) a polyolefin film substrate layer;
   (b) a layer of an ethylene vinyl alcohol copolymer (EVOH), and
   (c) a heat sealable acrylic polymeric coating applied to (b).

2. The multilayer heat sealable film of claim 1 which further comprises:
   (d) an adhesive tie layer between (a) said polyolefin film substrate layer and (b) said layer of an ethylene vinyl alcohol copolymer.

3. The multilayer heat sealable film of claim 2 wherein: said polyolefin film substrate layer is a polyolefin selected from the group consisting of low density polyethylene, high density polyethylene, linear low density polyethylene, polypropylene, and copolymers of ethylene with higher olefins.

4. The multilayer heat sealable film of claim 3 wherein: said heat sealable acrylic polymeric coating comprises a resin consisting essentially of an interpolymer of (a) from 2 to 15 parts by weight of an alpha-beta monoethylenically unsaturated carboxylic acid selected from the group consisting of acrylic acid, methacrylic acid, and mixtures thereof, and (b) from 85 to 98 parts by weight of neutral monomer esters.

5. The multilayer heat sealable film of claim 4 wherein: said adhesive tie layer comprises a member selected from the group consisting of an ethylene-vinyl acetate copolymer, a high density polyethylene based adhesive, and a maleic anhydride grafted low density polyethylene.

6. The multilayer heat sealable film of claim 5 wherein said polyolefin film substrate layer comprises homopolymer polypropylene; and
   said adhesive tie layer comprises a maleic anhydride modified olefin polymer.

7. The multilayer heat sealable film of claim 6 wherein said adhesive tie layer comprises a maleic anhydride grafted low density polyethylene.

8. The multilayer heat sealable film of claim 1 wherein said film has been biaxially oriented from 3 to 7 times in the machine direction and from 4 to 15 times in the transverse direction.

9. The multilayer heat sealable film of claim 1 wherein said layer of an ethylene vinyl alcohol copolymer (EVOH) ranges from 0.001–0.30 mil thickness, said multilayer film ranges from 0.5 to 2.0 mil in overall thickness, and said multilayer film has a minimum seal temperature of less than 93° C.

10. The multilayer heat sealable film of claim 1 wherein said layer of an ethylene vinyl alcohol copolymer (EVOH) ranges from 0.01–0.20 mil thickness, said multilayer film ranges from 0.7 to 1.30 mil in overall thickness, and said multilayer film has a minimum seal temperature no greater than 82° C.

11. A method for reducing the minimum seal temperature of an acrylic coated multilayer film having a polyolefin film core layer which comprises incorporating an EVOH skin layer on at least one side of said core layer prior to coating said multilayer film with acrylic coating.

12. The method of claim 11 wherein said acrylic coated multilayer heat sealable film further comprises:

placing an adhesive tie layer between said polyolefin film core layer and said layer of an ethylene vinyl alcohol copolymer.

13. The method of claim 12 wherein:

said polyolefin film core layer is a polyolefin selected from the group consisting of low density polyethylene, high density polyethylene, linear low density polyethylene, polypropylene, and copolymers of ethylene with higher olefins;

said heat sealable acrylic polymeric coating comprises a resin consisting essentially of an interpolymer of (a) from 2 to 15 parts by weight of an alpha-beta monoethylenically unsaturated carboxylic acid selected from the group consisting of acrylic acid, methacrylic acid, and mixtures thereof, and (b) from 85 to 98 parts by weight of neutral monomer esters; and said adhesive tie layer comprises a member selected from the group consisting of an ethylene-vinyl acetate copolymer, a high density polyethylene based adhesive, and a maleic anhydride grafted low density polyethylene.

14. The method of claim 13 wherein said polyolefin film core layer comprises homopolymer polypropylene; and said adhesive tie layer comprises a maleic anhydride modified olefin polymer.

15. The method of claim 14 wherein said adhesive tie layer comprises a maleic anhydride grafted low density polyethylene.

16. The method of claim 11 which further comprises coextruding said polyolefin film core layer and said EVOH skin layer and said biaxially orienting said coextruded film from 3 to 7 times in the machine direction and from 4 to 15 times in the transverse direction.

17. The method of claim 12 which further comprises coextruding said polyolefin film core layer, said EVOH skin layer and said adhesive tie layer.

18. The method of claim 17 which further comprises:

treating said multilayer film by corona or flame treatment.

19. A method for preparing an acrylic coated multilayer film which comprises a) coextruding i) a polyolefin film core layer and ii) an EVOH skin layer on at least one side of said core layer to form a coextrudate;

b) biaxially orienting said coextrudate; and c) coating said biaxially oriented coextrudate with acrylic coating.

* * * * *